United States Patent
Jones

(10) Patent No.: US 7,430,349 B2
(45) Date of Patent: Sep. 30, 2008

(54) METHOD FOR INCREASING DAYLIGHT DISPLAY BRIGHTNESS FOR HELMET MOUNTED DISPLAYS

(75) Inventor: Michael I. Jones, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 158 days.

(21) Appl. No.: 10/903,241

(22) Filed: Jul. 30, 2004

(65) Prior Publication Data

US 2005/0180706 A1    Aug. 18, 2005

Related U.S. Application Data

(60) Provisional application No. 60/544,595, filed on Feb. 13, 2004.

(51) Int. Cl.
G02B 6/04 (2006.01)
G02B 6/06 (2006.01)

(52) U.S. Cl. ........................... 385/115; 385/119
(58) Field of Classification Search ................ 359/577, 359/618, 630; 349/11
See application file for complete search history.

(56) References Cited

U.S. PATENT DOCUMENTS

| | | | | |
|---|---|---|---|---|
| 3,838,909 A * | 10/1974 | Fitzgibbons | ................. | 349/62 |
| 4,997,263 A | 3/1991 | Cohen et al. | ................. | 350/345 |
| 5,083,120 A | 1/1992 | Nelson | ................. | 340/784 |
| 5,771,039 A * | 6/1998 | Ditzik | ................. | 345/178 |
| 5,815,229 A | 9/1998 | Shapiro | ................. | 349/95 |
| 5,986,730 A * | 11/1999 | Hansen et al. | ................. | 349/96 |
| 6,348,995 B1 * | 2/2002 | Hansen et al. | ................. | 359/486 |
| 6,580,477 B1 | 6/2003 | Cho | ................. | 349/65 |
| 6,592,232 B2 * | 7/2003 | McGowan | ................. | 362/27 |
| 2002/0036831 A1 * | 3/2002 | Inoguchi et al. | ................. | 359/630 |
| 2004/0046730 A1 * | 3/2004 | Miyashita et al. | ................. | 345/102 |
| 2005/0174516 A1 * | 8/2005 | Yee et al. | ................. | 349/114 |

FOREIGN PATENT DOCUMENTS

WO    WO 00/70404    11/2000

\* cited by examiner

*Primary Examiner*—Michelle Connelly-Cushwa
*Assistant Examiner*—Chris Chu
(74) *Attorney, Agent, or Firm*—Bracewell & Giuliani LLP

(57) ABSTRACT

The present invention provides an optical system and method that substantially eliminates or reduces disadvantages and problems associated with previously developed optical visual display systems and methods used for displaying critical visual symbology or rastered imagery in high ambient brightness environments.

31 Claims, 10 Drawing Sheets

METHOD FOR INCREASING DAYLIGHT DISPLAY BRIGHTNESS FOR HELMET MOUNTED DISPLAYS

CROSS-REFERENCE TO RELATED APPLICATION

This application claims the benefit of priority to U.S. Provisional Patent Application No. 60/544,595 filed on Feb. 13, 2004 entitled "METHOD FOR INCREASING DAYLIGHT DISPLAY BRIGHTNESS FOR HELMET MOUNTED DISPLAYS", and is incorporated herein by reference in its entirety.

GOVERNMENT INTEREST

This invention was made with Government support under Contract Number N00019-02-C-3002 awarded by the Department of the Navy. The Government has certain rights in this invention.

TECHNICAL FIELD OF THE INVENTION

The present invention relates generally to optical systems and methods that increase display brightness, and more particularly, a system and method for pilot visual optical displays to increase the display brightness of a heads up or helmet-mounted display using ambient light.

BACKGROUND OF THE INVENTION

A helmet mounted or heads up visual display is often susceptible to illumination conditions where a viewer is incapable of seeing the display because the display brightness cannot produce sufficient intensity and contrast in order to display an image to the viewer. When a helmet mounted or heads up visual display is operating in very bright daylight, it is often possible for illumination conditions to exist wherein a pilot is incapable of seeing the display. Existing helmet mounted virtual displays cannot produce brightness of sufficient intensity to present rastered video imagery to a pilot above approximately 1.2:1 contrast ratio against through visor-seen brightness at or about 10,000 foot-lamberts. Video contrast requirements are in the 3:1 to 4:1 contrast ratio range. Higher brightness displays are possible but require active thermal cooling and add significant weight, volume and cost to the system. In the case of a pilot, the weight of added active thermal cooling causes the center of gravity to shift and introduce an undesirable top heavy center of gravity when the pilot is wearing the helmet. These reasons combine to make a helmet display utilizing a higher brightness unsuitable for use in high-g performance fighter aircraft. Therefore, a need is present to boost the display brightness in daylight that introduces no significant weight, volume, or power penalties to the helmet and display system.

In conditions with high levels of ambient light, it may become impossible for a viewer, (the pilot) to see the symbology contained within the display. This condition results when the backlit light emitting diode (LED) array fails to provide sufficient illumination required to provide contrast in high brightness environments. LEDs that are typically used to back light a liquid crystal display (LCD) display are approximately about three watts per display. In the bright environments these LEDs fail to provide a sufficient optical energy to create a usefully visible contrast within the display. Typically these conditions require a 2:1 or 3:1 contrast to properly see the display. One solution increases the power and brightness of the LED to maintain the required contrast in higher ambient illumination levels. However, heat dissipation problems arise as the output of the LED is increased as the LEDs are not 100 percent efficient. Typically, the currently available heat sinks are only capable of dissipating the heat associated with three watt LEDs. An increase above three watts requires additional cooling, which is typically supplied by liquid cooling.

Thus, the current technology fails to provide a display that can overcome high illumination environments and provide sufficient contrast in the display for the viewers. This failure results form inefficiencies within the LEDs and heat is created by available LEDs. Thus, the imagery will basically disappear above a certain light level.

SUMMARY OF THE INVENTION

The present invention provides a system and method for increasing the display brightness associated with a backlit display that substantially addresses the above-identified needs, as well as others. More specifically, the present invention provides a system operable to increase the brightness of a backlit display using ambient light. This system utilizes collection optics operable together with ambient optical energy, such as sunlight. An optical channel operably couples to the collection optics and is further operable to transmit the gathered ambient optical energy to illumination optics. The illumination optics serve to illuminate or backlight a display to be imaged.

A second embodiment of the present invention provides a system operable to increase the brightness of a helmet mounted display (HMD) using ambient light. Collection optics gather ambient optical energy from the exterior of a helmet. The fact is collection optics themselves may be mounted on the exterior of the helmet. Optical channels coupled to the collection optics and transmit or provide an optical pathway for the gathered ambient optical energy to be carried from the collection optics to illumination optics. An illuminator array is used to backlight a display to be imaged. This illuminator array typically utilizes LEDs or other like devices to backlight the display. However, in high ambient light environments, illumination optics operably coupled to the optical channel and terminate at interstices of the illuminator array to provide additional backlight for the display to be imaged. These collection optics may compromise lenslet arrays, Fresnel arrays, or other like optical devices as known to those skilled in the art. The optical channel may be made from a fused image conduit, a flexible optical fiber bundle, or other like device known to those skilled in the art. Additionally, the illumination optics may compromise a leaky wave guide, optical prisms, or other like devices.

Another embodiment of the present invention provides a method to increase the contrast associated with a backlit image presented in a high ambient light environment. This involves gathering ambient optical energy with collection optics. The gathered optical energy is then transmitted to the illumination optics with an optical channel operably coupled to the collection optics. A backlit image is illuminated in a high ambient light environment with illumination optics operably coupled to the optical channel as well as an illuminator array of devices such as LEDs.

Yet another embodiment of the present invention provides a method to reduce a visual signature associated with an object. This reduction of visual signature involves gathering optical energy with collection optics located on a first side of the object. This gathered optical energy is transmitted to illumination optics located on a second side of the object with an optical channel. By transmitting the gathered ambient light energy from the illumination objects on the second side of the object, a contrast between the object and the ambient environment may be reduced.

Yet another embodiment of the present invention provides a system and method to illuminate an interior space with exterior ambient lighting. This involves gathering ambient optical energy with collection optics located on an exterior surface of a structure. This gathered ambient optical energy is transmitted to illumination optics located on at least one interior surface within the structure via an optical channel coupled to the collection optics. The interior space is then illuminated by transmitting the gathered ambient energy from the illumination optics located at the interior surface. An optical switch located along the optical channel may serve to direct the gathered ambient energy to a user selected interior surface.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures, like numerals being used to refer to like and corresponding parts of the various drawings.

Figure 1:
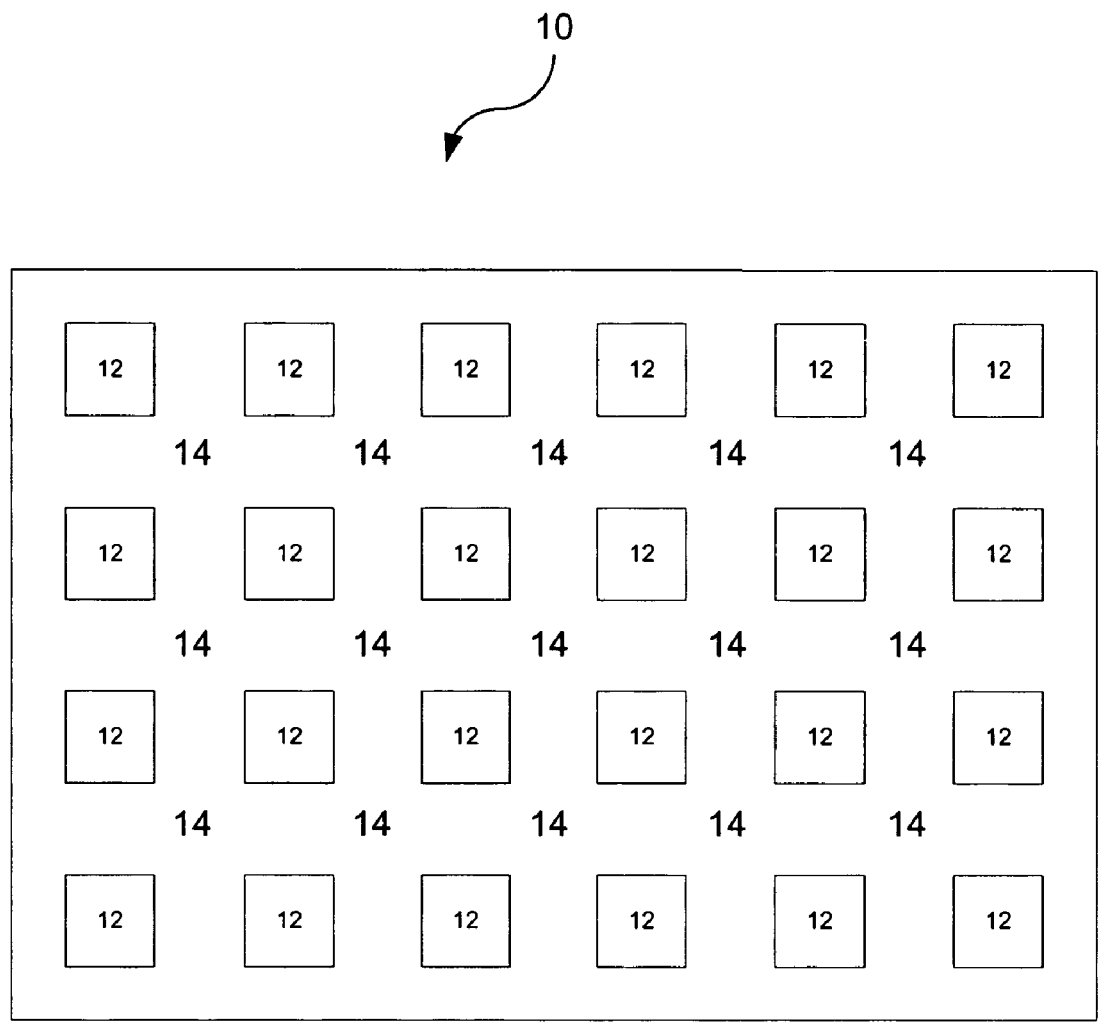
FIG. 1 depicts one example of an array of LEDs used to illuminate the helmet-mounted displays.
Figure 2A:
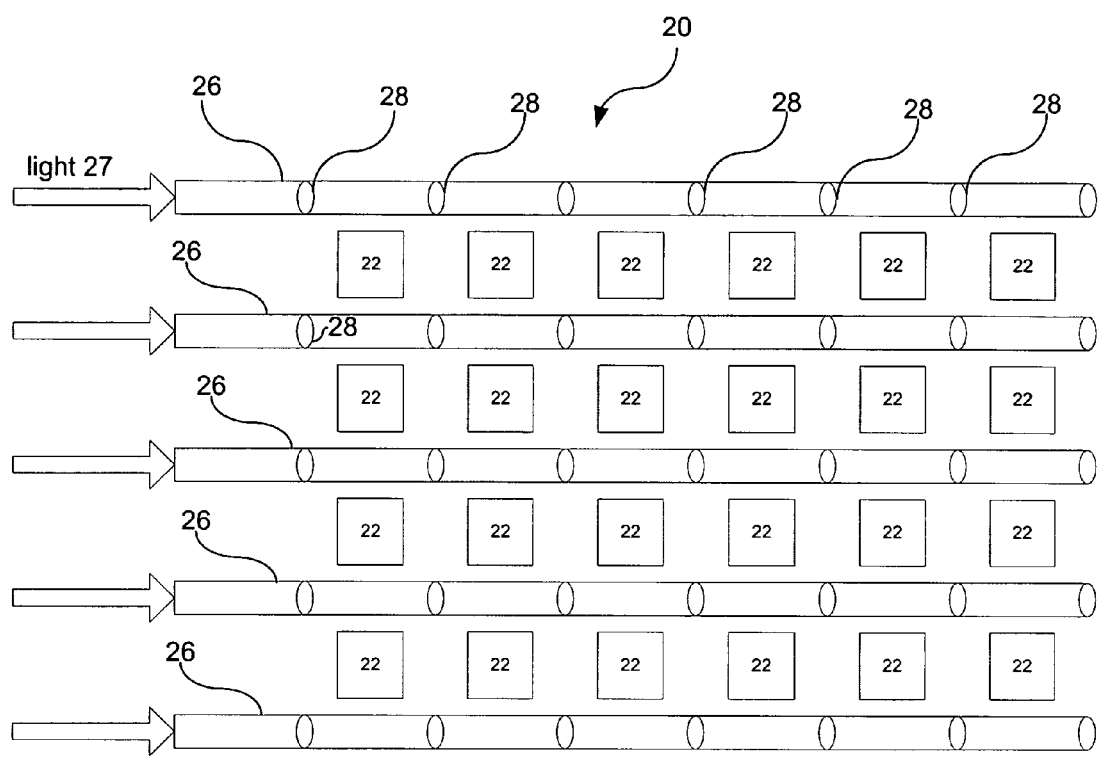
FIGS. 2A and 2B shows a loom of fiber optics or other optical carriers.
Figure 2B:
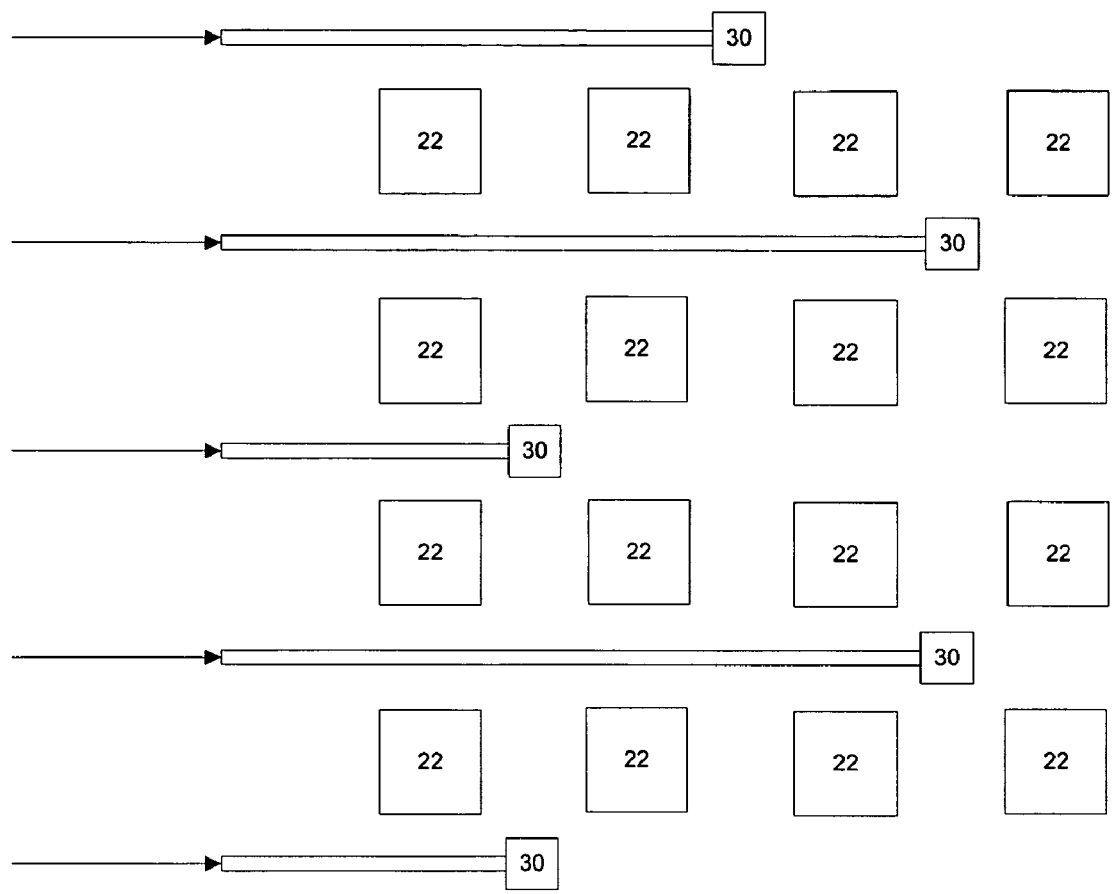

FIG. 1 depicts one example of an array of LEDs used to back-illuminate the LCD arrays in helmet-mounted displays (HMDs). Here, a typical array of LEDs illuminates a display in helmet mounted display environment. As one can see, array 10 of LED 12 is not continuous. It has a large amount of interstitial space 14 located amongst the LEDs. The present invention takes advantage of the interstitial space by providing a loom of fiber optics or other optical carriers as illustrated in FIGS. 2A and 2B. Here array 20 of LEDs 22 has interlaced with optical carriers 24 which provide additional illumination at the interstitial points within array 20.

FIG. 2A depicts an optical loom wherein leaky array fiber 26 transmits sunlight 27 or other illumination through leaky coupling slots 28. Individual leaky coupling slots 28 have varying sizes and configurations such that an equal amount of illumination emits from each leaky coupling slot 28 and all the remaining illumination exits through the final leaky coupling slot. As shown in FIG. 2A, sunlight couples to the leaky wave guides placed within the interstitial space amongst array 20.

As shown, the fibers 30 transmit sunlight or other illumination within them to the leaky wave guides, which allow optical energy to leave the wave guide or optical pipe in a direction perpendicular to the placement of the leaky wave guide. As shown in FIG. 2A, optical leaky coupling slots 28 allow optical energy to be directed perpendicular to the plane of the array and toward the LCD array.

It should be noted that the optical coupling slots depicted in FIG. 2A although shown as being identical, are not physically identical in their actual embodiment. They are designed to radiate identical amounts of optical energy from each slot, and this may require that the first optical coupling slot be smaller than the next optical coupling slot, however, these calculations are easily made by those skilled in the art.

This creates a uniform pattern of emitters within this array. FIG. 2B depicts terminating prisms spaced throughout the LED array in order to provide supplemental diffuse illumination of incoherent light for additional backlighting of the LCD array to further brighten the displayed image.

Figure 3A:
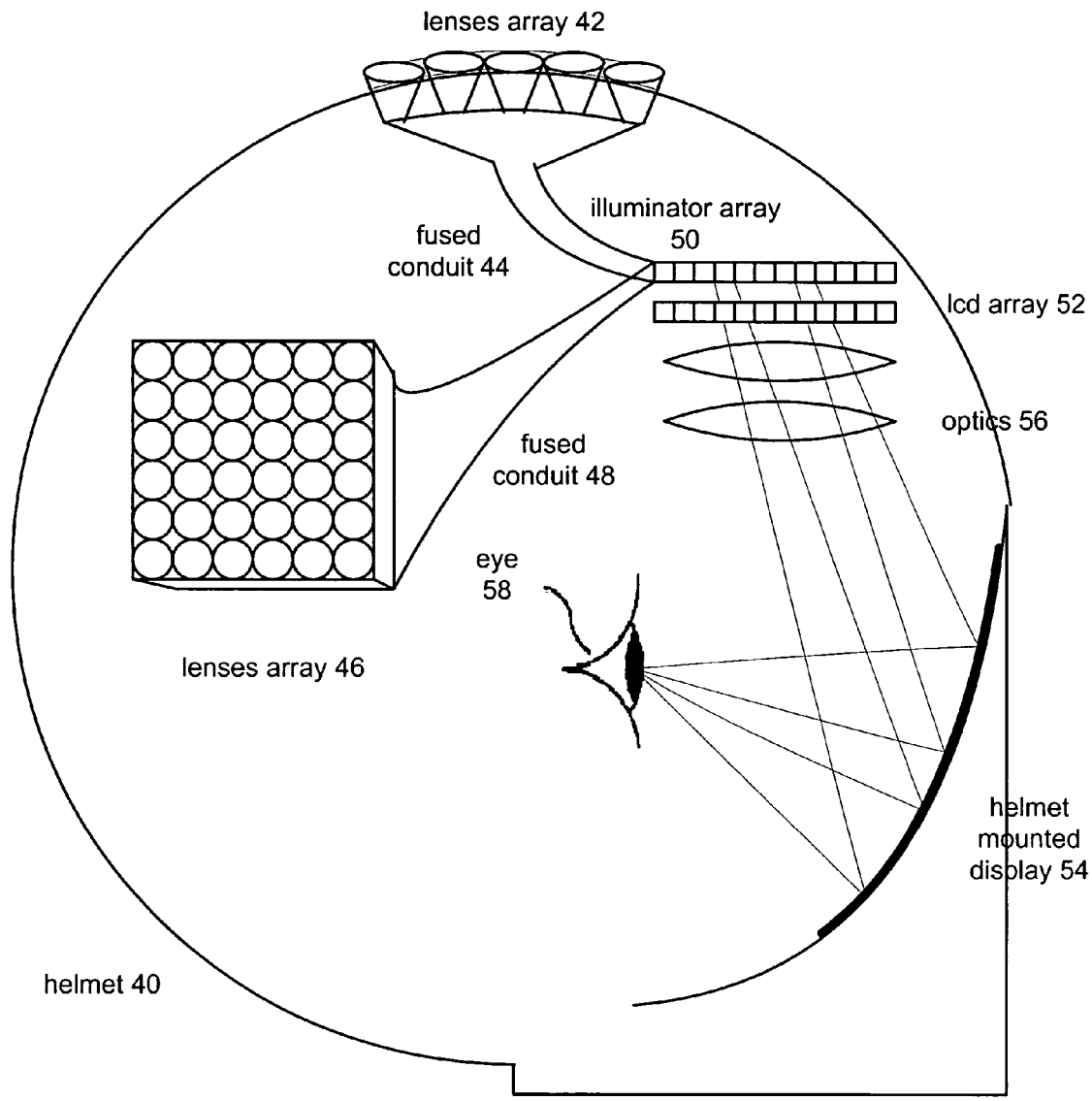
FIGS. 3A and 3B depicts an embodiment of the present invention wherein a helmet uses lenses array to collect optical energy.
Figure 3B:
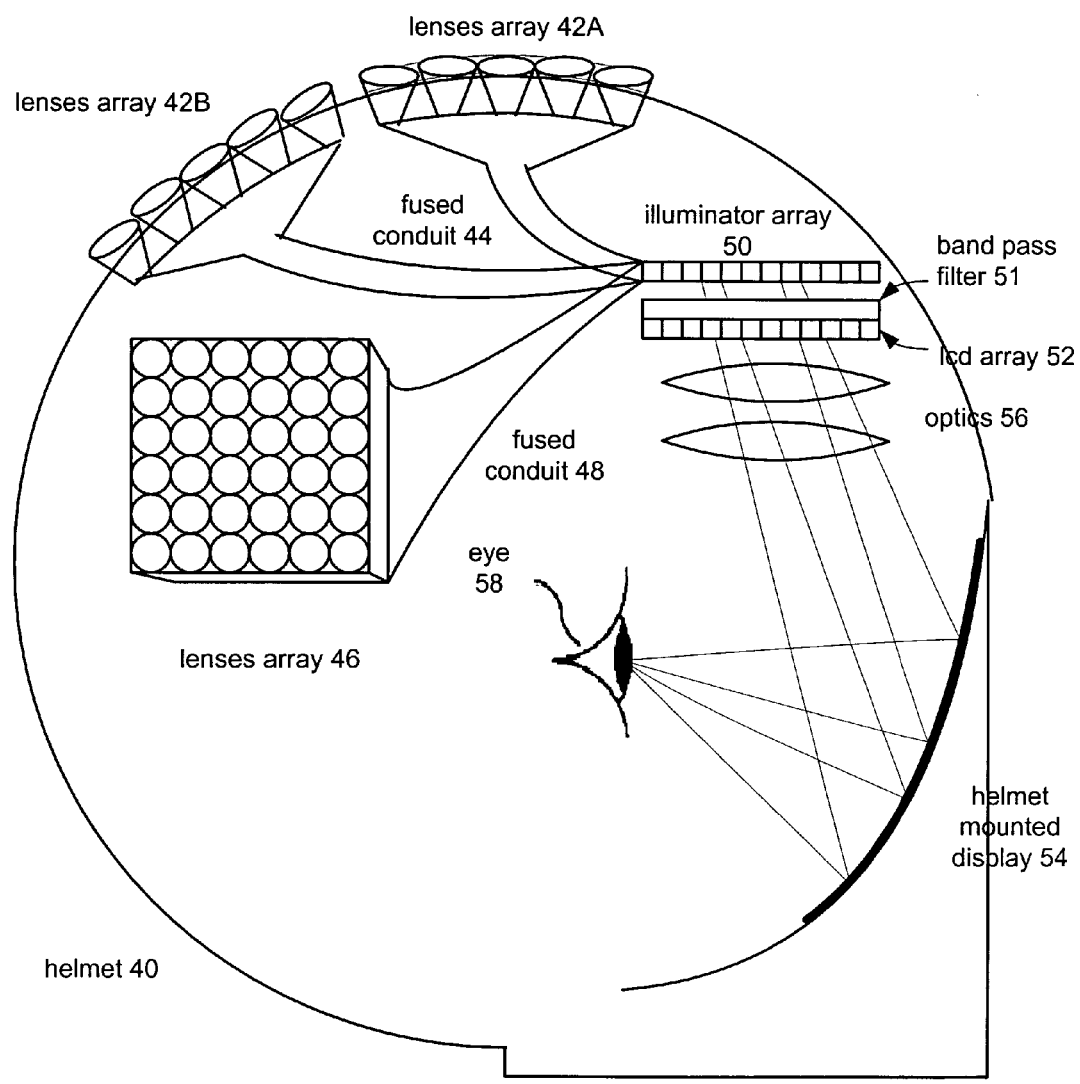

FIG. 3A depicts an embodiment wherein a helmet 40 uses a lens array 42 or other array of lenses and lenslets to collect optical energy through top collection array 42. In one embodiment, the top collection array may comprise an array of Fresnel lenses, which are injection molded, as known to those skilled in the art. This incoherent light is merged into a fused image conduit 44. To increase the likelihood of bright augmentation light sources over a large solid angle, secondary side mounted arrays 46 are also depicted wherein additional sets of lenses or lenslet arrays collect incident daylight optical energy and transmit that energy through fused optical conduit 48. FIG. 3B depicts that multiple arrays 42A and 42B may be used to provide a larger solid angle with which to collect ambient light at the surface of the helmet. Optical conduits 44 and 48 in one embodiment are rigid fiber bundles acting as a fused image conduit. In another embodiment, flexible fiber bundles may be used to transmit light from lenslet arrays 42 and 46. Light from either rigid image conduits or flexible fiber bundles is paralleled into an illuminator array 50. Thus, when in high illumination environments, sunlight or other ambient light will provide additional backlighting to LED array 50 in order to sufficiently illuminate the LCD array 52 to ensure that an image of sufficient contrast is presented on the helmet-mounted display 54 in high brightness operating conditions. Optics 56 may be associated, may be placed in the optical pathway to properly focus the image on the helmet-mounted display 54. This image is seen by the pilot's eye 58.

The white light used to augment the LED light source array illumination in high ambient light levels does not require additional spectral filtering because the additional ambient light, like the broad spectrum light provided by the LEDs within array 50, is passed through a band pass filter 51 within LCD array 52. This provides a significant advantage over prior solutions in that the ambient optical energy collected by lenslet arrays 42 and 46 and delivered to LED illuminator array 50 does not create an additional heat load to by the system. Further, no energy source is required within the helmet or from the host aircraft, as this light is passively collected from the ambient and automatically collected in high illumination environments. In low illumination environments, little or no ambient outside illumination exists, and this invention does not provide additional illumination that would reduce the image contrast seen by the pilot's eye. Thus, this extra illumination provided at the LED 50 is essentially free and must only take into account the optical losses within the collection arrays, fiber conduits or bundles, and leaky wave guides or other method of projecting the optical energy to the LCD arrays.

Figure 4:
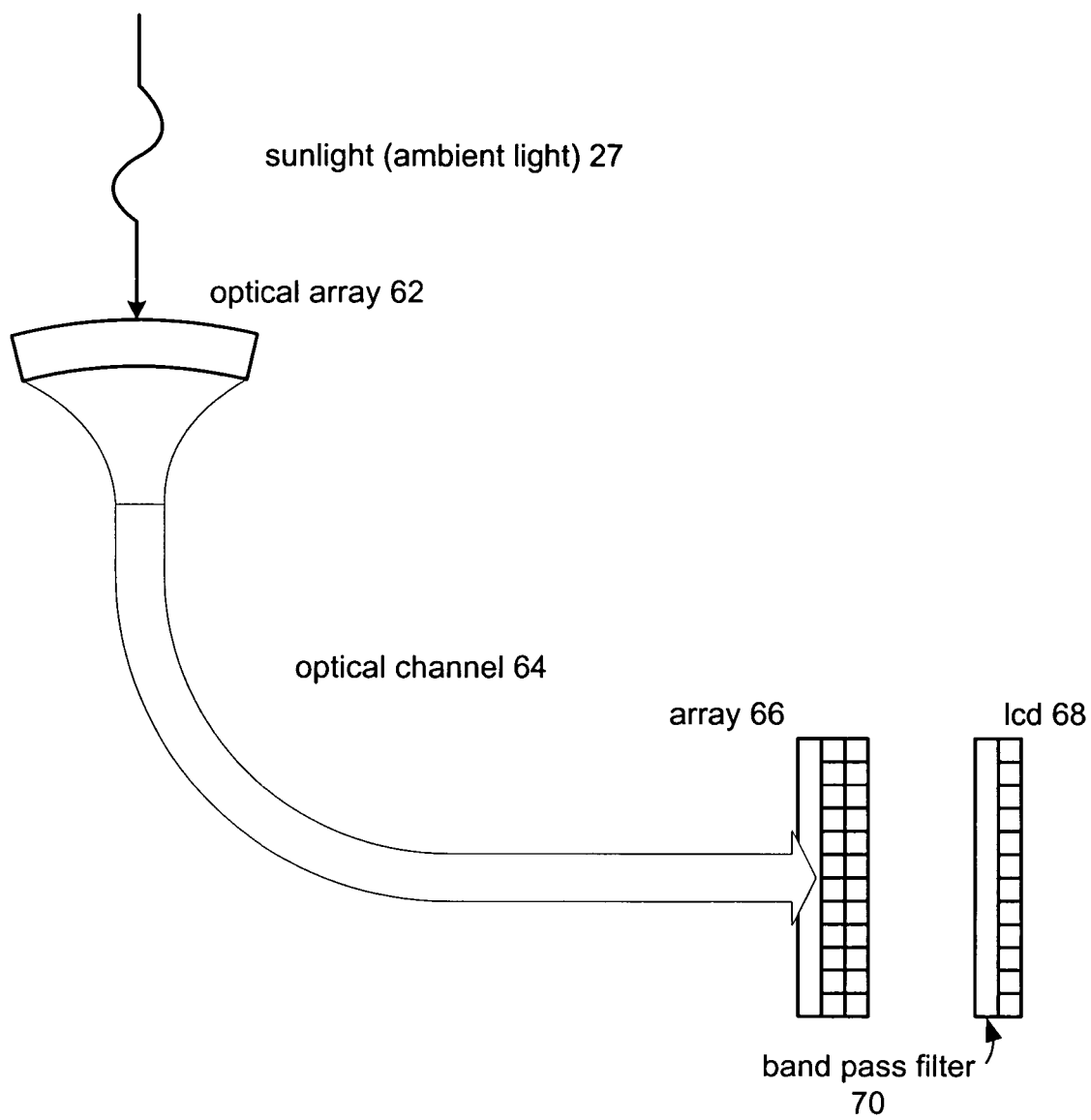
FIG. 4 depicts how ambient light is collected within an optical array and funneled into an optical channel.

FIG. 4 depicts how direct or scattered sunlight 60 is collected within an optical array 62 and funneled into an optical channel 64. Optical energy within channel 64 is conducted to and distributed through an array 66, which as previously discussed may be an array of LEDs or other illumination methods used to backlight an LCD display 68. In LCD-based or holographic-based displays, a band pass filter 70 must be used to filter out undesirable wavelengths and provide near-monochrome light to LCD's or holographs. This is particularly true in applications where it is undesirable that the display be easily seen by night vision goggles operating at or about 550 nanometers.

Figure 5:
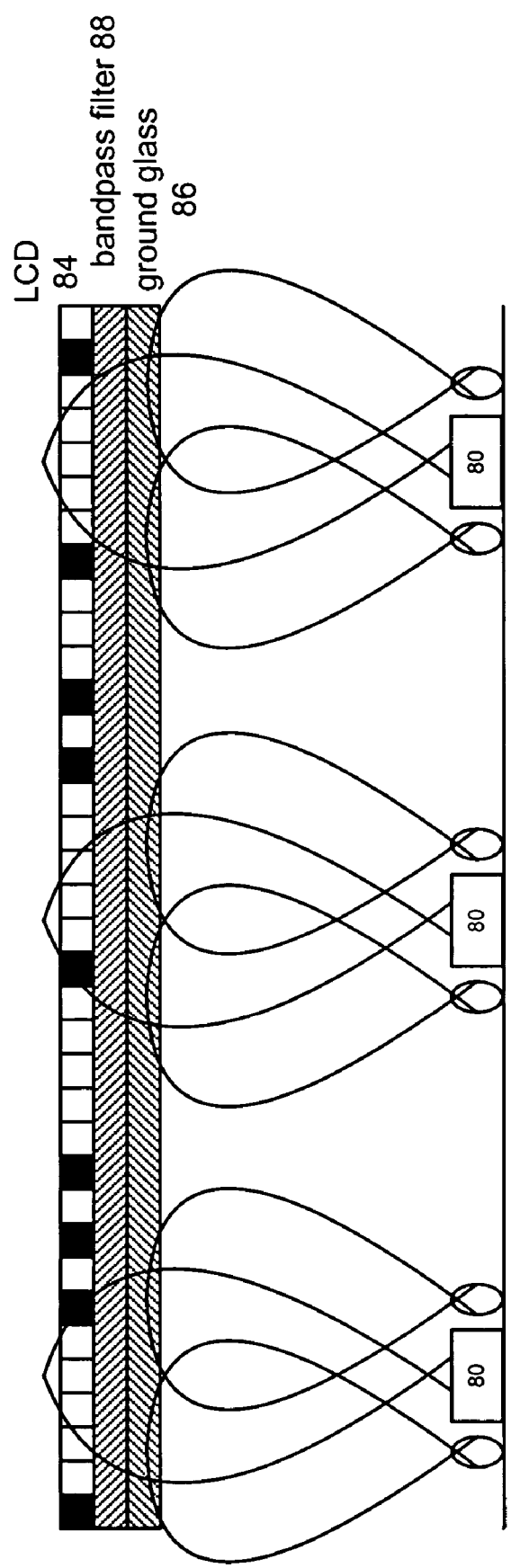
FIG. 5 depicts a cross section of the system employed by the present invention.

FIG. 5 depicts a cross section of the system employed by the present invention. Here, LEDs 80 are supplemented by additional optical energy collected by array 62 and distributed within a series of leaky wave guides, prisms or other systems and methods as known to those skilled in the art. Here, the optical energy used to backlight LCD 84 is shown as passing through a layer of ground glass 86 and band pass filter 88. Thus, the optical energy adds passively collected optical energy incoherently to the optical energy supplied by the LEDs, in order to augment diffuse backlighting to the LCD and increase display brightness in high brightness ambient lighting conditions. Some direct or scattered light from the LED array may couple back into the fibers and be emitted by the lenslet arrays. Thus, it may be desirable in certain tactical applications to cap the arrays on the helmet to prevent LED light from escaping the lenslet arrays depicted in FIG. 3. However, the optical coupling may be construed such that there are sufficient inefficiencies within the optical conduits that no appreciable optical energy flows in the reverse direction and exits from the array.

Figure 6:
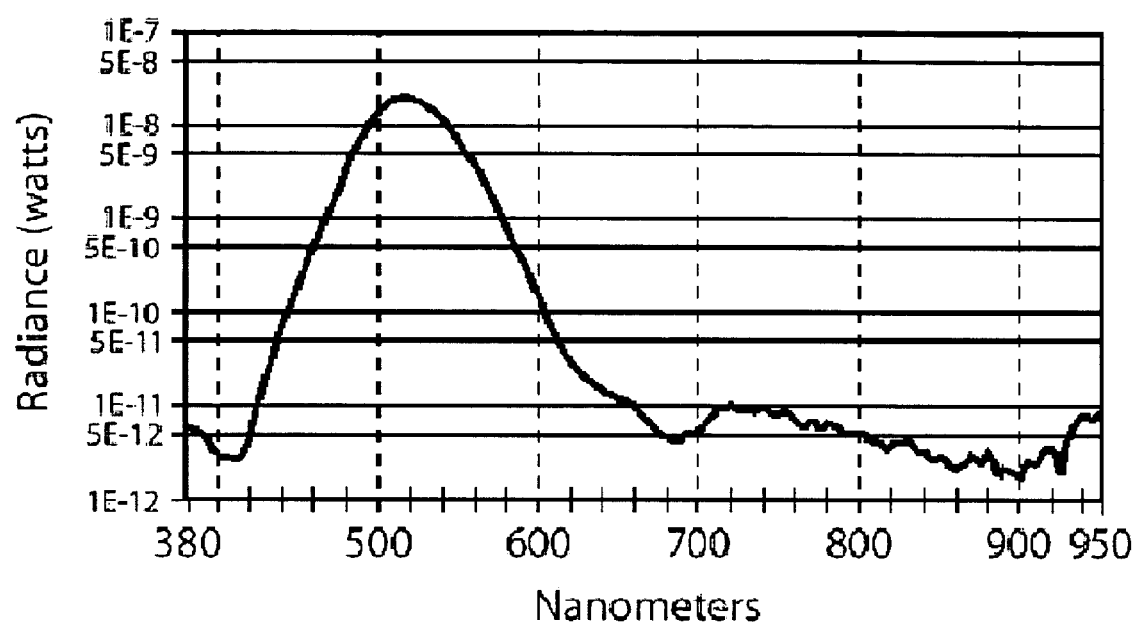
FIG. 6 illustrates the effect of the band pass filter within the present invention.

FIG. 6 illustrates the effect of the band pass filter within the present invention. The band pass filter acts to prevent that part of the spectrum typically used within night vision goggles (NVGs) from escaping back into the optical channel and where it could escape from the lenslet arrays.

Figure 7:
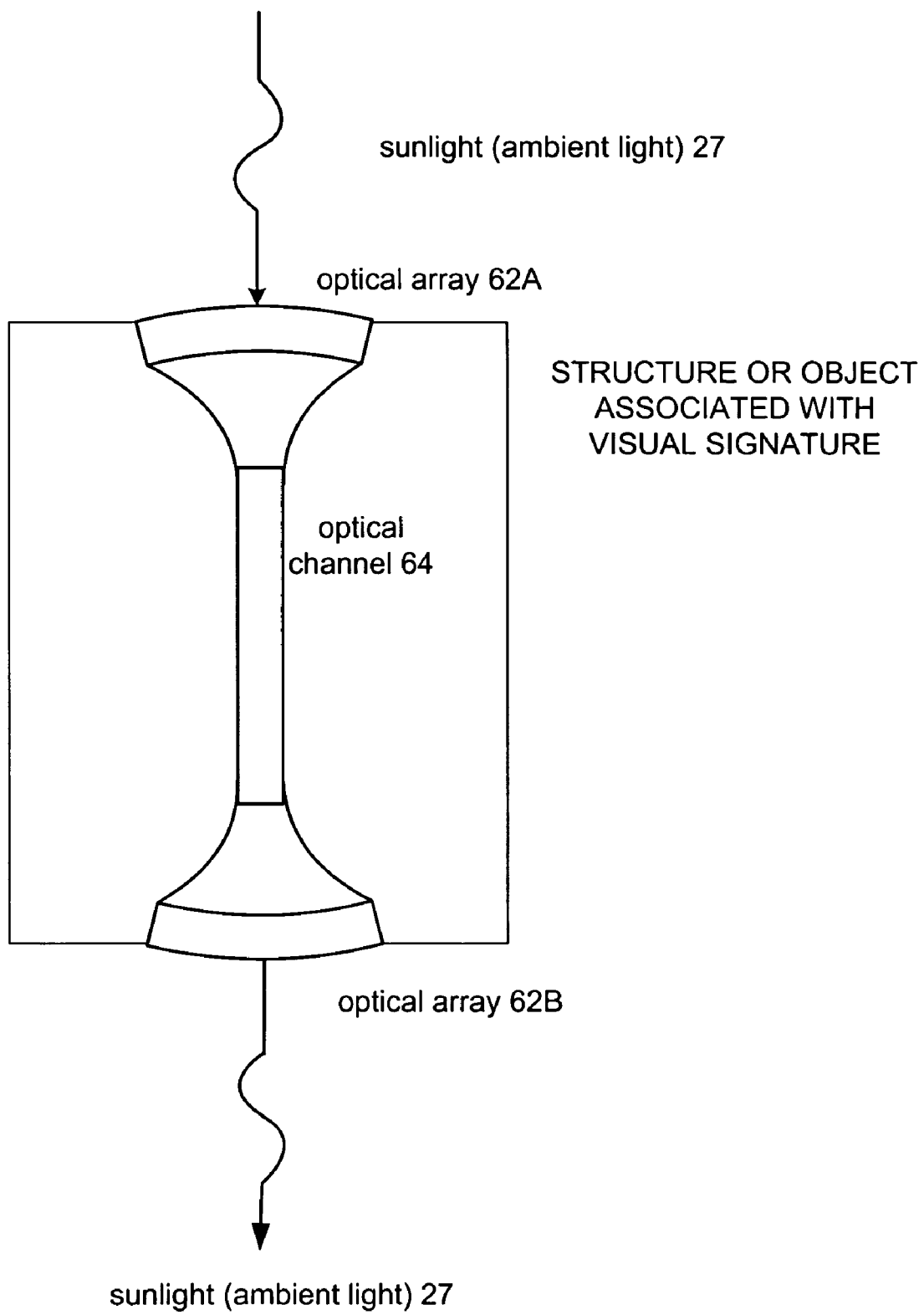
FIG. 7 illustrates how the visual signature associated with a structure or object may be reduced.

FIG. 7 illustrates how the visual signature associated with a structure or object may be reduced. Ambient light 27, such as sunlight, is gathered with an optical array optical array 62A. Optical array 62A is embedded within a first surface of an object for which the visual signature is to be reduced. The gathered ambient light collected by optical array 62A is transmitted via optical channel 64 to a second optical array 62B located on an opposite side of the object. Optical array 62B transmits the gathered ambient light energy from its location on the surface of the structure. These optical arrays may completely cover both sides of the structure and will essentially allow the ambient light energy to be transmitted from one side of the structure to the other in order to reduce any visual contrast associated with the structure. For example, in the case of an aircraft the structure may comprise the wings and fuselage of the aircraft such that overhead light is gathered on an upper surface and then transmitted from the lower surface in order to reduce the shadow or visual signature associated with the aircraft.

Figure 8:
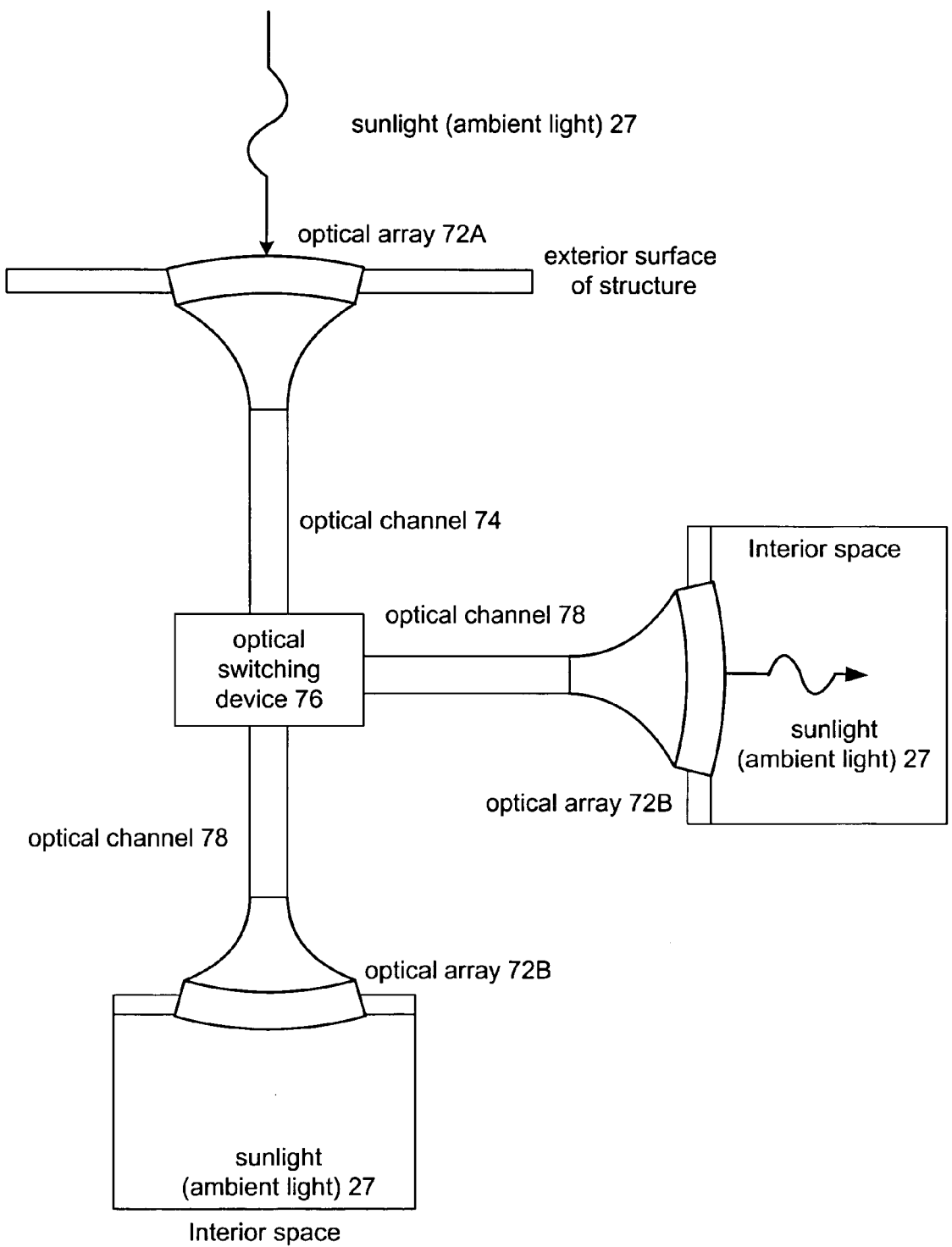
FIG. 8 illustrates another use for such ambient light-gathering technologies.

FIG. 8 illustrates another use for such ambient light-gathering technologies. Here, ambient light or sunlight 27 is gathered by optical array 72A located on an exterior surface of the structure. Optical array 72A couples to a first leg of optical channel 74 as previously discussed. Optical channel 74 may be a rigid fused image conduit, a flexible optical fiber, a bundle of flexible optical fibers, or other like optically transmissive device known to those skilled in the art. Optical switching device 76 receives the optical channel energy from the first leg of optical channel 74 and then redirects that gathered ambient light to an interior space using a second optical channel 78 and optical array 72B to illuminate the interior space. The optical switching device may comprise prism(s), mirror(s) or other like device known to those skilled in the art to allow the optical energy received in the first leg of optical channel 74 to be directed to a user selected optical channel 78 for illumination of a user selected interior space.

In addition to the above described applications, the present invention may be applied in any circumstance where it is useful to increase the illumination behind an image to be displayed in a high ambient light environment. For example, such applications may include virtual reality (VR) devices, handicapped visual aids, or any device where there is a need to augment existing illumination to provide lighting without increasing the power consumption of the device.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention may be specifically applied to helmet mounted displays used by pilots and tactical aircraft, many other similar applications are available for this technology. Generally, the present invention may be applied wherever a backlit LCD is used to project a display image in a high illumination environment. Additionally, this system need not be limited to only backlit LCD systems, but other similar systems known to those skilled in the art, which require backlighting to image a display.

What is claimed is:

1. A system operable to increase brightness of a backlit display using ambient light, comprising:
   collection optics operable to gather ambient optical energy;
   an optical channel operably coupled to the collection optics, wherein the optical channel is operable to transmit the gathered ambient optical energy; and
   illumination optics operably coupled to the optical channel, wherein the illumination optics backlight a display to be imaged, and wherein the illumination optics terminate at interstices of an illuminator array.

2. The system of claim 1, wherein the collection optics further comprise at least one lenslet array.

3. The system of claim 1, wherein the collection optics further comprise at least one array of Fresnel lenses.

4. The system of claim 1, wherein the optical channel further comprises a fused image conduit.

5. The system of claim 1, wherein the optical channel further comprises a flexible fiber bundle.

6. The system of claim 1, wherein the illumination optics further comprise leaky wave guides.

7. The system of claim 1, wherein the illumination optics further comprise optical prisms.

8. The system of claim 1, wherein the illuminator array comprises an array of light emitting diodes (LEDs).

9. The system of claim 1, wherein the backlit display comprises a helmet mounted display (HMD).

10. The system of claim 9, wherein the collection optics are mounted on a helmet.

11. The system of claim 1, wherein the illuminator array comprises an array of light emitting diodes (LEDs).

12. A system operable to increase brightness of a helmet mounted display (HMD), using ambient light, comprising:
    collection optics operable to gather ambient optical energy, wherein the collection optics are mounted on the exterior of a helmet;
    an optical channel operably coupled to the collection optics, wherein the optical channel is operable to transmit the gathered ambient optical energy; and
    an illuminator array to backlight a display to be imaged, and wherein illumination optics operably coupled to the optical channel terminate at interstices of the illuminator array to additionally backlight the display to be imaged.

13. The system of claim 12, wherein the collection optics further comprise at least one lenslet array.

14. The system of claim 12, wherein the collection optics further comprise at least one array of Fresnel lenses.

15. The system of claim 12, wherein the optical channel further comprises a fused image conduit.

16. The system of claim 12, wherein the optical channel further comprises a flexible fiber bundle.

17. The system of claim 12, wherein the illumination optics further comprise leaky wave guides.

18. The system of claim 12, wherein the illumination optics further comprise optical prisms.

19. A method to increase contrast of a backlit image presented in a high ambient light environment, comprising:
    gathering ambient optical energy with collection optics;
    transmitting the gathered optical energy to illumination optics with an optical channel operably coupled to the collection optics, wherein the optical channel is operable to transmit the gathered ambient optical energy; and
    illuminating the backlit image presented in a high ambient light environment with illumination optics operably coupled to the optical channel, wherein the illumination optics backlight the image with the gathered ambient light, and wherein the illumination optics terminate at interstices of the illuminator array.

20. The method of claim 19, wherein the collection optics further comprise at least one lenslet array.

21. The method of claim 19, wherein the collection optics further comprise at least one array of Fresnel lenses.

22. The method of claim 19, wherein the optical channel further comprises a fused image conduit.

23. The method of claim 19, wherein the optical channel further comprises a flexible fiber bundle.

24. The system of claim 19, wherein the illumination optics further comprise leaky wave guides.

25. The system of claim 19, wherein the illumination optics further comprise optical prisms.

26. The system of claim 19, wherein the illuminator array comprises an array of light emitting diodes (LEDs).

27. The method of claim 19, wherein the backlit display comprises a helmet mounted display (HMD).

28. The method of claim 27, wherein the collection optics are mounted on a helmet.

29. A method to reduce a visual signature of an object comprising:
    gathering ambient optical energy with collection optics located on a first side of the object;
    transmitting the gathered optical energy to illumination optics located on a second side of a object with an optical channel operably coupled to the collection optics, wherein the optical channel is operable to transmit the gathered ambient optical energy; and
    reducing a contrast between an ambient environment and the object by transmitting gathered ambient optical energy gathered from optics on the first side of the object with optics located on the second side of the object.

30. A method to illuminate an interior space with exterior ambient lighting comprising:
    gathering ambient optical energy with collection optics located on an exterior surface of a structure;
    transmitting the gathered optical energy to illumination optics located on at least one interior surface within the structure with an optical channel operably coupled to the collection optics, wherein the optical channel is operable to transmit the gathered ambient optical energy; and
    illuminating the interior space by transmitting gathered ambient optical energy from illumination optics located at the interior surface.

31. The method of claim 30, wherein an optical switch directs the gathered optical energy to a user selected interior surface.

* * * * *